US012633773B2

(12) United States Patent
Lo

(10) Patent No.: US 12,633,773 B2
(45) Date of Patent: May 19, 2026

(54) COSMETIC COMPACT WITH WIRELESS CHARGING

(71) Applicant: RQ Innovasion Inc., Edmonton (CA)

(72) Inventor: Lenny Kwok Ming Lo, Edmonton (CA)

(73) Assignee: RQ Innovasion Inc., Edmonton (CA)

( * ) Notice: Subject to any disclaimer, the term of this patent is extended or adjusted under 35 U.S.C. 154(b) by 959 days.

(21) Appl. No.: 17/804,374

(22) Filed: May 27, 2022

(65) Prior Publication Data

US 2023/0387720 A1     Nov. 30, 2023

(51) Int. Cl.
*H02J 7/00* (2006.01)
*A45D 33/00* (2006.01)
*H02J 50/10* (2016.01)

(52) U.S. Cl.
CPC ............ *H02J 50/10* (2016.02); *A45D 33/008* (2013.01); *H02J 7/0042* (2013.01); *H02J 7/0048* (2020.01); *H02J 7/0068* (2013.01); *A45D 2033/001* (2013.01)

(58) Field of Classification Search
CPC .............................. H02J 7/0068; H02J 7/0048
See application file for complete search history.

(56) References Cited

U.S. PATENT DOCUMENTS

2012/0279516 A1* 11/2012 Bouix .................. A45D 40/265
132/301
2019/0341793 A1* 11/2019 Chien ................. F21V 33/0004
2020/0340636 A1* 10/2020 Bertken ............... F21V 21/096

* cited by examiner

*Primary Examiner* — Robert Grant
(74) *Attorney, Agent, or Firm* — Patterson + Sheridan, LLP

(57) ABSTRACT
A compact includes a lower portion, an upper portion, a first mirror, a battery, a circuit, and a coil. The upper portion is movably coupled to the lower portion by a hinge such that the upper portion rotates about the hinge to transition from a closed state to an open state. The first mirror is disposed in the lower portion such that the first mirror is visible when the upper portion is in the open state. The battery is disposed within the lower portion. The circuit is electrically coupled to the battery. The coil is disposed within the upper portion and electrically coupled to the circuit such that the coil produces an oscillating magnetic field when electric power is provided to the coil by the battery and through the circuit.

20 Claims, 7 Drawing Sheets

COSMETIC COMPACT WITH WIRELESS CHARGING

TECHNICAL FIELD

Embodiments presented in this disclosure generally relate to a cosmetic compact. More specifically, embodiments disclosed herein relate to a cosmetic compact that provides wireless charging.

BACKGROUND

Cosmetic compacts assist users in applying cosmetic products when the users are away from home (e.g., at a restaurant, at a park, etc.). The users may store the cosmetic compacts in their pockets or bags and retrieve the cosmetic compacts when the users want to apply cosmetic products.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
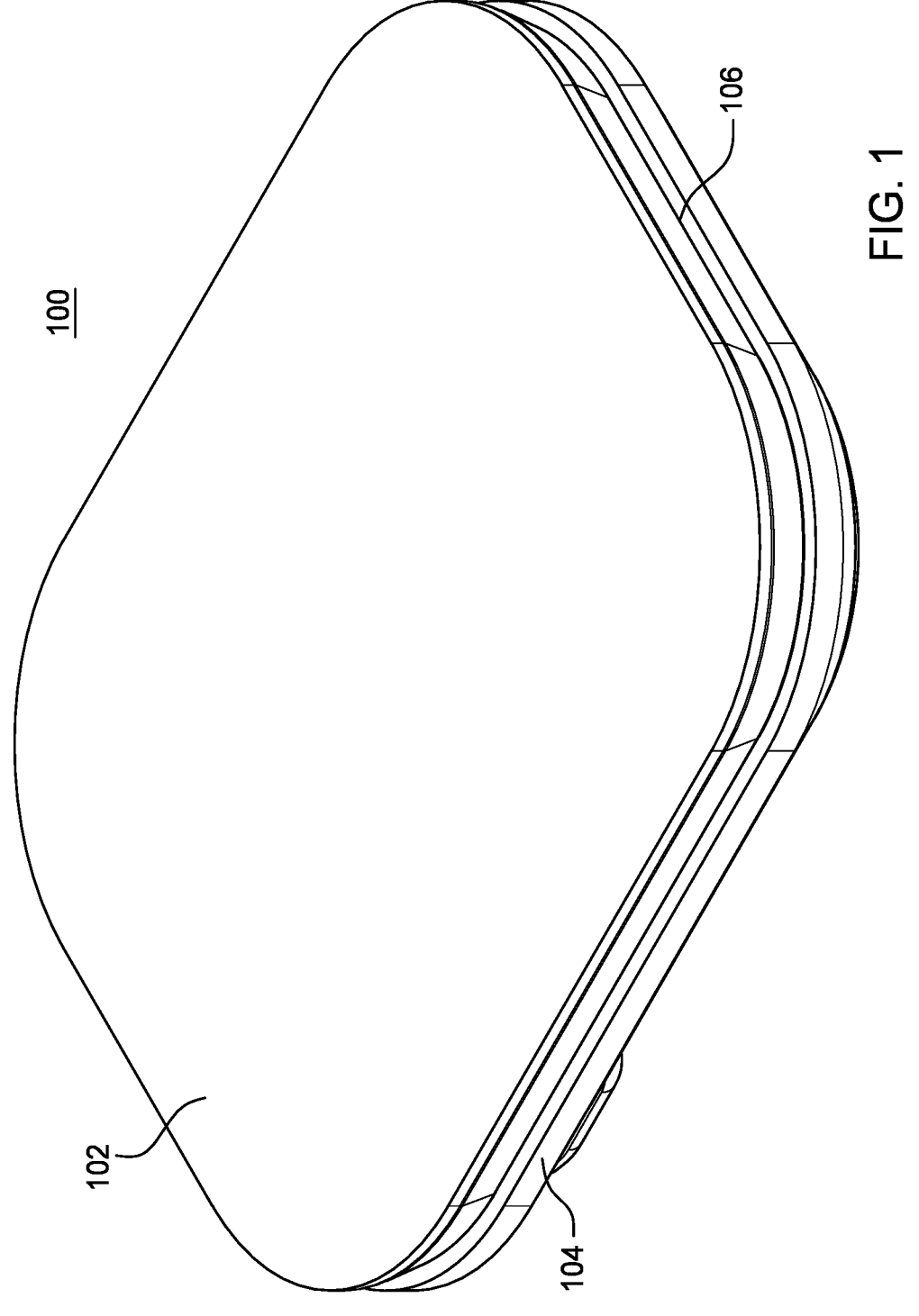
FIG. 1 illustrates an example compact.

According to an embodiment, a compact includes a lower portion, an upper portion, a first mirror, a battery, a circuit, and a coil. The upper portion is movably coupled to the lower portion by a hinge such that the upper portion rotates about the hinge to transition from a closed state to an open state. The first mirror is disposed in the lower portion such that the first mirror is visible when the upper portion is in the open state. The battery is disposed within the lower portion. The circuit is electrically coupled to the battery. The coil is disposed within the upper portion and electrically coupled to the circuit such that the coil produces an oscillating magnetic field when electric power is provided to the coil by the battery and through the circuit.

According to another embodiment, a system includes a lower portion, an upper portion, a first mirror, a battery, and a coil. The upper portion is movably coupled to the lower portion by a hinge such that the upper portion rotates about the hinge to transition from a closed state to an open state. The first mirror is disposed in the lower portion such that the first mirror is visible when the upper portion is in the open state. The battery is disposed within the lower portion. The coil is disposed within the upper portion and electrically coupled to the battery such that the coil produces an oscillating magnetic field when electric power is provided to the coil by the battery.

According to another embodiment, a system includes a lower portion, an upper portion, a first mirror, a battery, and a coil. The upper portion is movably coupled to the lower portion. The first mirror is disposed in the lower portion. The battery is disposed within the lower portion. The coil is disposed within the upper portion and electrically coupled to the battery such that the coil produces an oscillating magnetic field when electric power is provided to the coil by the battery.

EXAMPLE EMBODIMENTS

Cosmetic compacts help users apply cosmetic products. For example, cosmetic compacts may include mirrors that allow the users to see their faces when applying cosmetic products. Conventional compacts, however, offer a limited set of features at a time when users desire more functionality from the items they carry in their pockets or bags.

The present disclosure describes a cosmetic compact that provides several technical features that may not be included in conventional compacts. The cosmetic compact includes a battery and a circuit that provide electric energy to power some of these features. For example, the cosmetic compact may include a light (e.g., light emitting diode) around the mirror in the compact. The light illuminates a user's face when the user is applying cosmetic products. Additionally, the light may signal a charging status of the battery. As another example, the cosmetic compact may include a coil that produces an oscillating electric field, which allows the compact to wirelessly charge another device near the compact. In this manner, the compact provides additional technical features relative to conventional compacts.

FIG. 1 illustrates an example compact 100. As seen in FIG. 1, the compact 100 includes an upper portion 102 and a lower portion 104. The upper portion 102 and the lower portion 104 may be in a clamshell arrangement such that the compact 100 may open and close by rotating or moving the upper portion 102 and the lower portion 104 away or towards each other. When opened, the compact 100 includes certain features, such as a mirror, that assist a user when applying cosmetic products. The compact 100 may include other technical features that improve the user experience. For example, the compact 100 may include a light that illuminates the user's face to further assist the user when applying cosmetic products. As another example, the compact 100 may house an electric coil that generates an oscillating electric field, which may wirelessly charge another device near the compact 100.

In certain embodiments, the upper portion 102 includes an edge 106. The edge 106 may be beveled such that the lower portion 104 extends further out than portions of the edge 106. As a result, the edge 106 allows the user to form a better grip on the compact 100, which reduces the likelihood that the user will drop and damage the compact 100.

Figure 2:
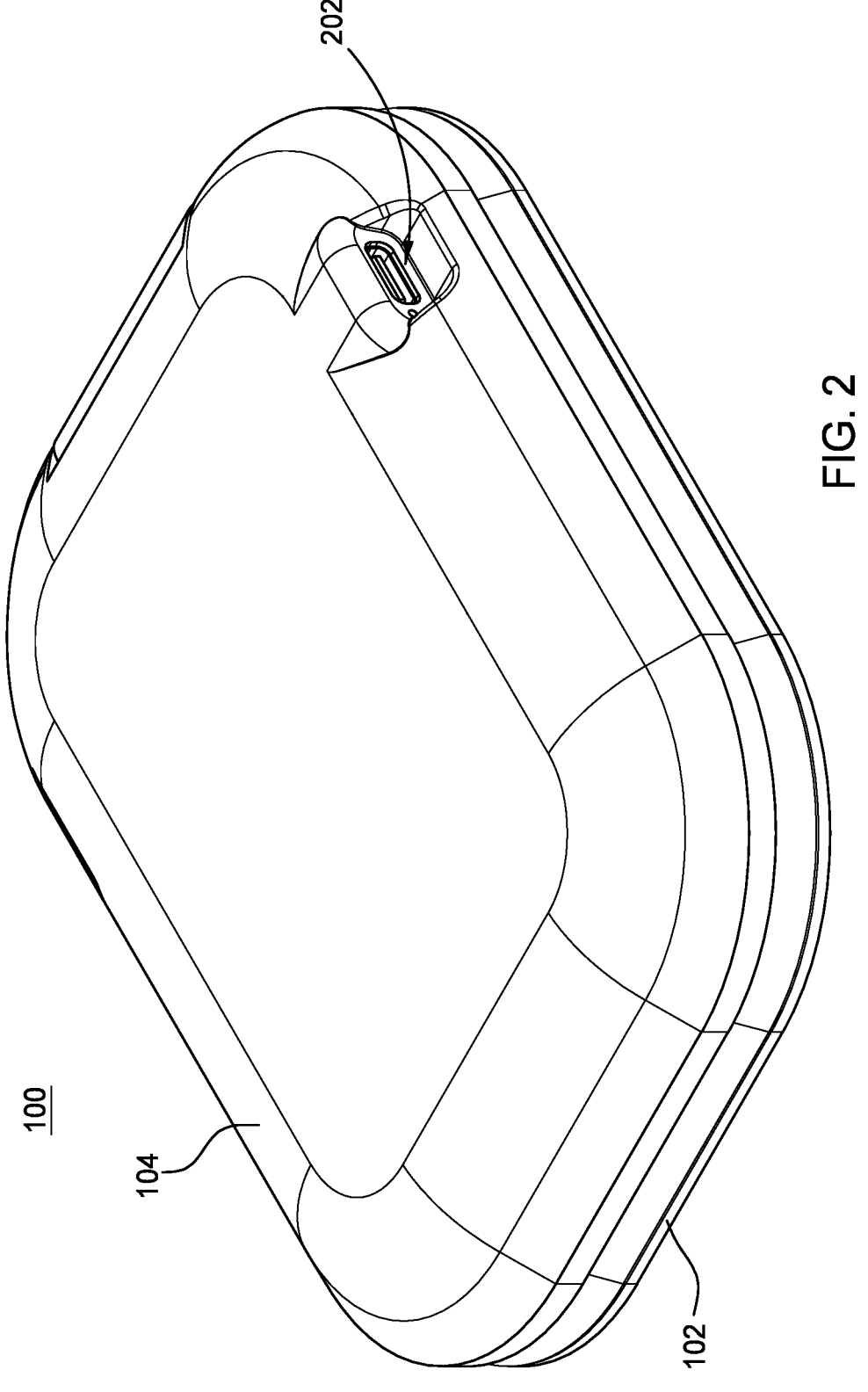
FIG. 2 illustrates the compact of FIG. 1.

FIG. 2 illustrates the compact 100 of FIG. 1. As seen in FIG. 2, the lower portion 104 includes a port 202. The port 202 may be any suitable port and may receive any suitable type of cable. For example, the port 202 may be a universal serial bus (USB) port (e.g., type A, mini-USB, micro-USB, type B, type C, etc.). As another example, the port 202 may be a power port that receives a power cable. Electric power may be supplied through the port 202. For example, electric power may be supplied through the port 202 into the compact 100 to charge a battery within the compact 100. As another example, electric power may be supplied from the battery, through the port 202, and out of the compact 100 to charge another device connected to the compact 100. The battery within the compact 100 may discharge through the port 202 to charge the connected device. In this manner, the compact 100 may serve as a charging bank for other devices.

Figure 3:
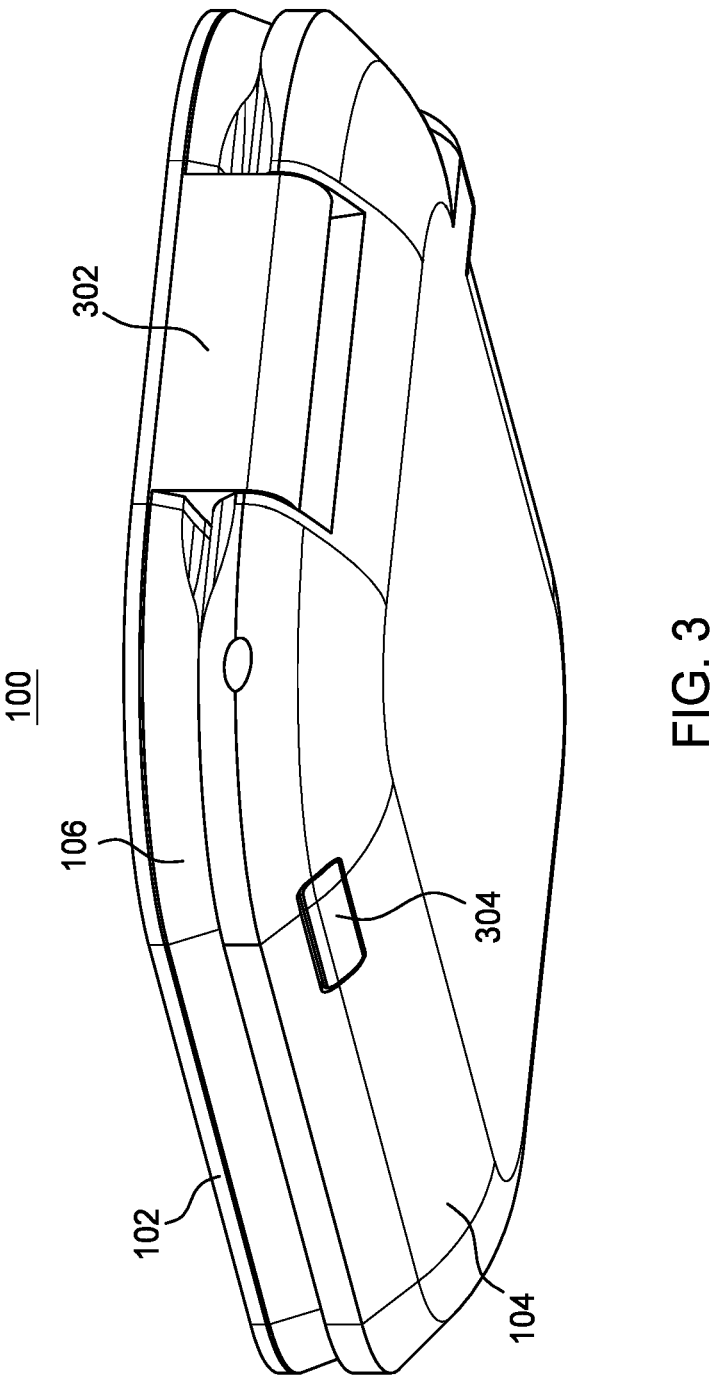
FIG. 3 illustrates the compact of FIG. 1.

FIG. 3 illustrates the compact 100 of FIG. 1. As seen in FIG. 3, the upper portion 102 and the lower portion 104 are in a clamshell arrangement. The upper portion 102 is attached to the lower portion 104 by a hinge 302. The upper portion 102 or the lower portion 104 may rotate about the hinge 302 to open and close the compact 100. In the example of FIG. 3, the compact 100 is closed. In some embodiments, electric wiring or cabling may be housed in or through the hinge 302 to electrically connect electrical components in the upper portion 102 and the lower portion 104. For example, the wiring may connect a battery in the lower portion 104 with a light or an electric coil in the upper portion 102.

The lower portion 104 includes a button 304. A user may press the button 304 to activate or deactivate a wireless charging feature in the compact 100. For example, when the user presses the button 304, the battery may begin supplying electrical power to a coil housed in the upper portion 102 to activate the wireless charging feature. When the button 304 is pressed again, the battery may stop providing electric power to the coil to deactivate the wireless charging feature. As a result, the button 304 gives the user control over when wireless charging is activated and deactivated, which allows the battery in the compact 100 to hold charge for a longer period of time, in certain embodiments. Allowing the user to turn on the wireless charging feature only when it is needed extends the charge life of the battery and decreases the frequency at which the battery needs to be recharged.

Additionally, as seen in FIG. 3, the upper portion 102 includes an edge 106 that is beveled relative to the lower portion 104. As a result, the lower portion 104 extends further out than portions of the edge 106. The beveled edge 106 may allow the user to form a better grip when holding the compact 100, which reduces the likelihood that the user will drop and damage the compact 100, in certain embodiments.

Figure 4:
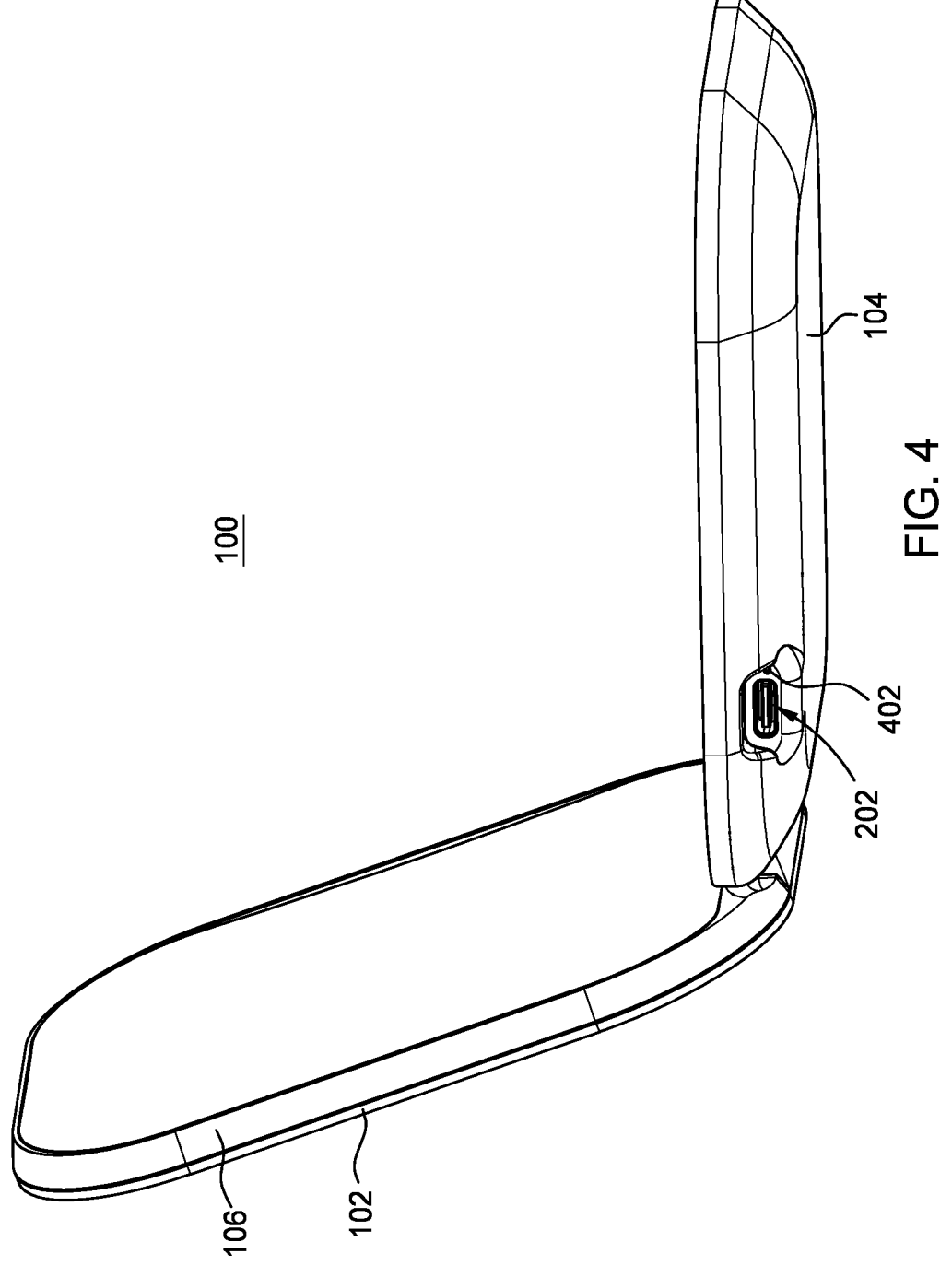
FIG. 4 illustrates the compact of FIG. 1.

FIG. 4 illustrates the compact 100 of FIG. 1. As seen in FIG. 4, the compact 100 is open. The user may have rotated the upper portion 102 or the lower portion 104 away from each other to open the compact 100. In certain embodiments, the beveled edge 106 makes it easier for the user to rotate the upper portion 102 or the lower portion 104 away from each other. For example, the beveled edge 106 allows the user to form a better grip on the upper portion 102, when rotating the upper portion 102 or the lower portion 104 away from each other.

As seen in FIG. 4, the lower portion 104 includes a light 402. The light 402 may be positioned next to the port 202. The light 402 may be an indicator light that signals when the wireless charging feature of the compact 100 is activated or deactivated. For example, when the wireless charging feature is activated, the light 402 may turn on or activate to provide a visual indicator that the wireless charging feature is activated. When the wireless charging feature is deactivated, the light 402 may turn off or deactivate to provide a visual indicator that the wireless charging feature is deactivated. Using the example from FIG. 3, when the user presses the button 304 to activate or deactivate the wireless charging feature, the light 402 may correspondingly activate or deactivate. In this manner, the compact 100 visually alerts the user as to when the wireless charging feature is activated or deactivated.

Figure 5:
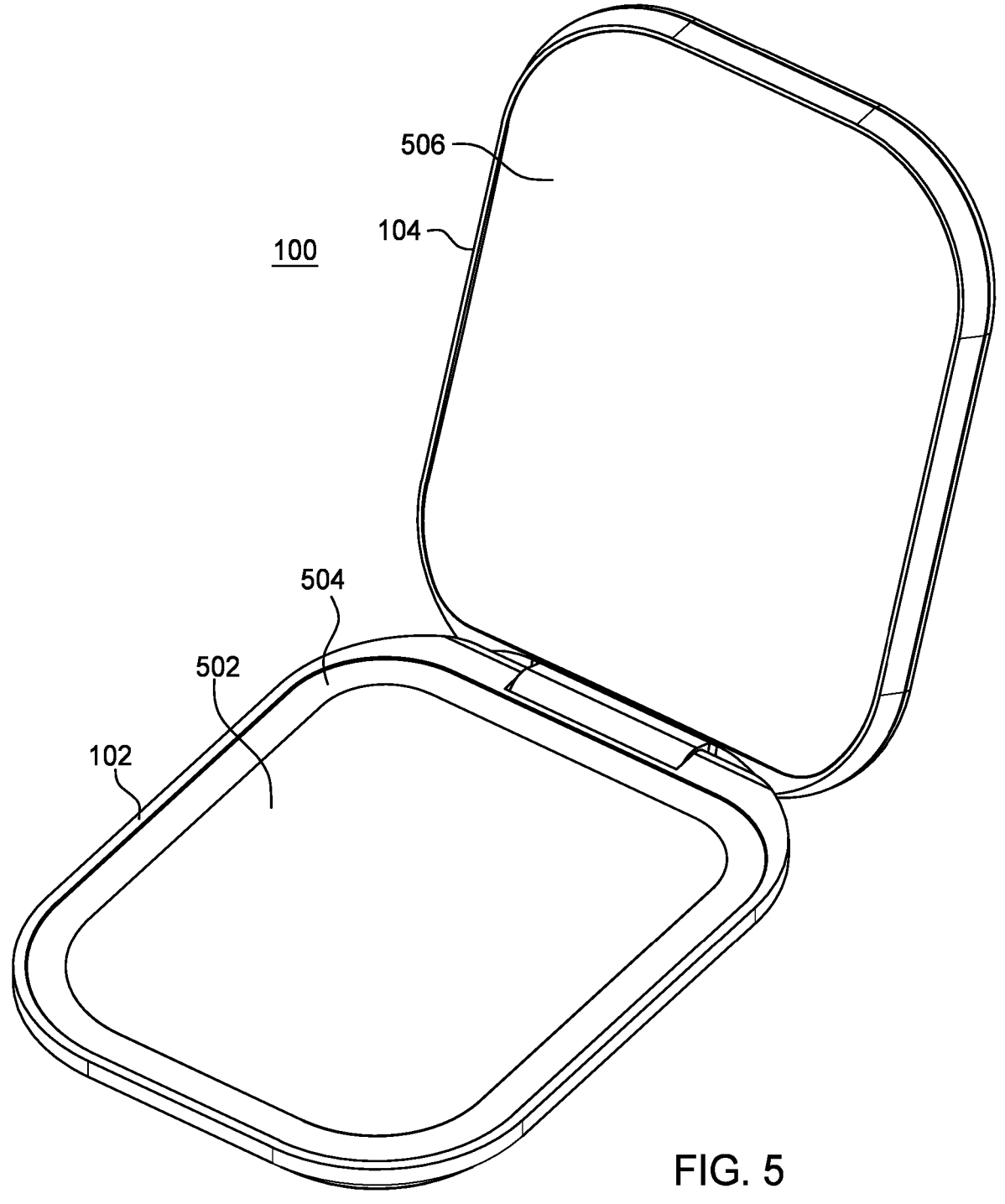
FIG. 5 illustrates the compact of FIG. 1.

FIG. 5 illustrates the compact 100 of FIG. 1. As seen in FIG. 5, the compact 100 is open. A mirror 502 is disposed in the upper portion 102. When the compact 100 is open, the user may look at the mirror 502 to see a reflection of the user, which assists the user when applying cosmetic products. In certain embodiments, the mirror 502 is curved, which provides magnification of certain portions of the user's face when the user looks into the mirror 502. The magnification provides further assistance when the user is applying cosmetic products to the magnified portion of the user's face.

Additionally, the upper portion 102 includes a light 504. As seen in FIG. 5, the light 504 may be disposed around the periphery of the mirror 502. The light 504 may include one or more light emitting diodes. The light 504 receives electrical power from the battery in the lower portion 104 of the compact 100. The light 504 may activate or turn on when the user opens the compact 100. When the user closes the compact 100, the light 504 may turn off or deactivate. The light 504 directs light towards the user's face, which illuminates the user's face and improves the reflection provided by the mirror 502. As a result the light 504 provides further assistance to the user, when the user is applying cosmetic products to the user's face.

In some embodiments, the light 504 may provide a visual indicator of a charging status of the battery in the lower portion 104. For example, when the battery is being charged or recharged, the light 504 may turn on or active to provide a visual indicator that the battery is charging. When the battery has completed charging or when the battery is not being charged, the light 504 may turn off to provide a visual indicator that the battery has finished charging or that the battery is not being charged. In some embodiments, because the upper portion 102 includes a beveled edge relative to the lower portion 104, a portion of the light 504 is visible to the user when the compact 100 is closed. For example, an outer ring of the light 504 may be visible to the user when the compact 100 is closed. The visible portion of the light 504 may provide a visual indication to the user of the charging status of the battery in the lower portion 104. For example, when the user looks at the closed compact 100, the user may see whether the light 504 is turned on or off to determine the charging status of the battery in the lower portion 104.

A lower item 506 is disposed in the lower portion 104. The lower item 506 may be any suitable item. For example, the lower item 506 may be another mirror that provides a reflection of a different portion of the user's face when the user is looking at the compact 100. As another example, the lower item 506 maybe a pocketed surface. The user may use the pockets formed on the surface to store other items (e.g., pictures or cards). As a result, the compact 100 may be customized through the lower item 506 to provide for different needs.

Figure 6:
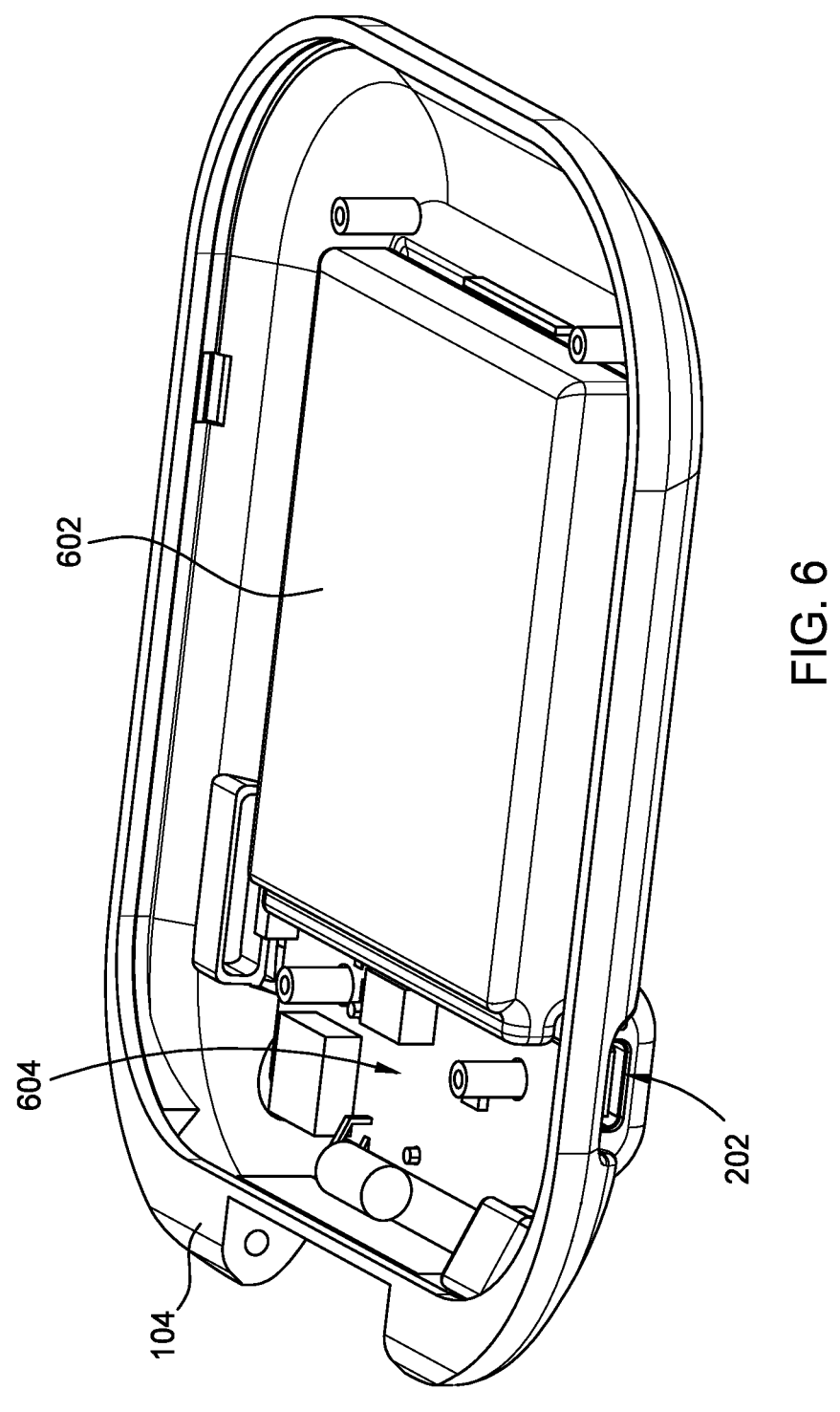
FIG. 6 illustrates a portion of the compact of FIG. 1.

FIG. 6 illustrates a portion of the compact 100 of FIG. 1. Specifically, FIG. 6 illustrates internal components of the lower portion 104 of the compact 100. As seen in FIG. 6, the lower portion 104 houses a battery 602 and a circuit 604. The battery 602 may be any suitable battery that is sized to store electrical energy. Electrical energy may be stored in the battery 602 by charging the battery 602 through the port 202. The battery 602 may provide electrical energy to other components in the compact 100 or to another device connected to the compact 100 through the port 202 by discharging the battery 602.

The circuit 604 may include one or more electrical components formed on a board (e.g., a printed circuit board). The circuit 604 may include the port 202 and may electrically couple to the battery 602. Additionally, the circuit 604 may control the flow of electrical energy in the compact 100. For example, the circuit 604 may detect when another device is connected to the compact 100 through the port 202. In response, the circuit 604 may direct electrical energy to flow from the battery 602, out the port 202, and into the connected device to charge the device. As another example, the circuit 604 may detect when electrical energy is being supplied externally to the compact 100 through the port 202. In response, the circuit 604 may direct the electrical energy to flow from the port 202 to the battery 602 to charge the battery 602. As yet another example, the circuit 604 may detect when a user has activated a wireless charging feature of the compact 100 (e.g., by pressing a button 304 show in FIG. 3). In response, the circuit 604 may direct electrical energy to flow from the battery 602 through a wire in a hinge of the compact 100 to a coil in the upper portion of the compact 100. The coil may then produce an oscillating electric field that wirelessly charges another device near the compact 100. In some embodiments, when the wireless charging feature is activated, the circuit 604 also supplies electric power to a light 402 (shown in FIG. 4) to provide a visual indicator that the wireless charging feature is activated. As yet another example, the circuit 604 may detect when the compact 100 is open (e.g., by a mechanical switch or actuator). In response, the circuit 604 may direct electrical energy to flow from the battery 602 to a light 504 (shown in FIG. 5) to turn on or activate the light. The light may illuminate the user's face, which allows the compact 100 to provide a better reflection of user's face, in certain embodiments.

Figure 7:
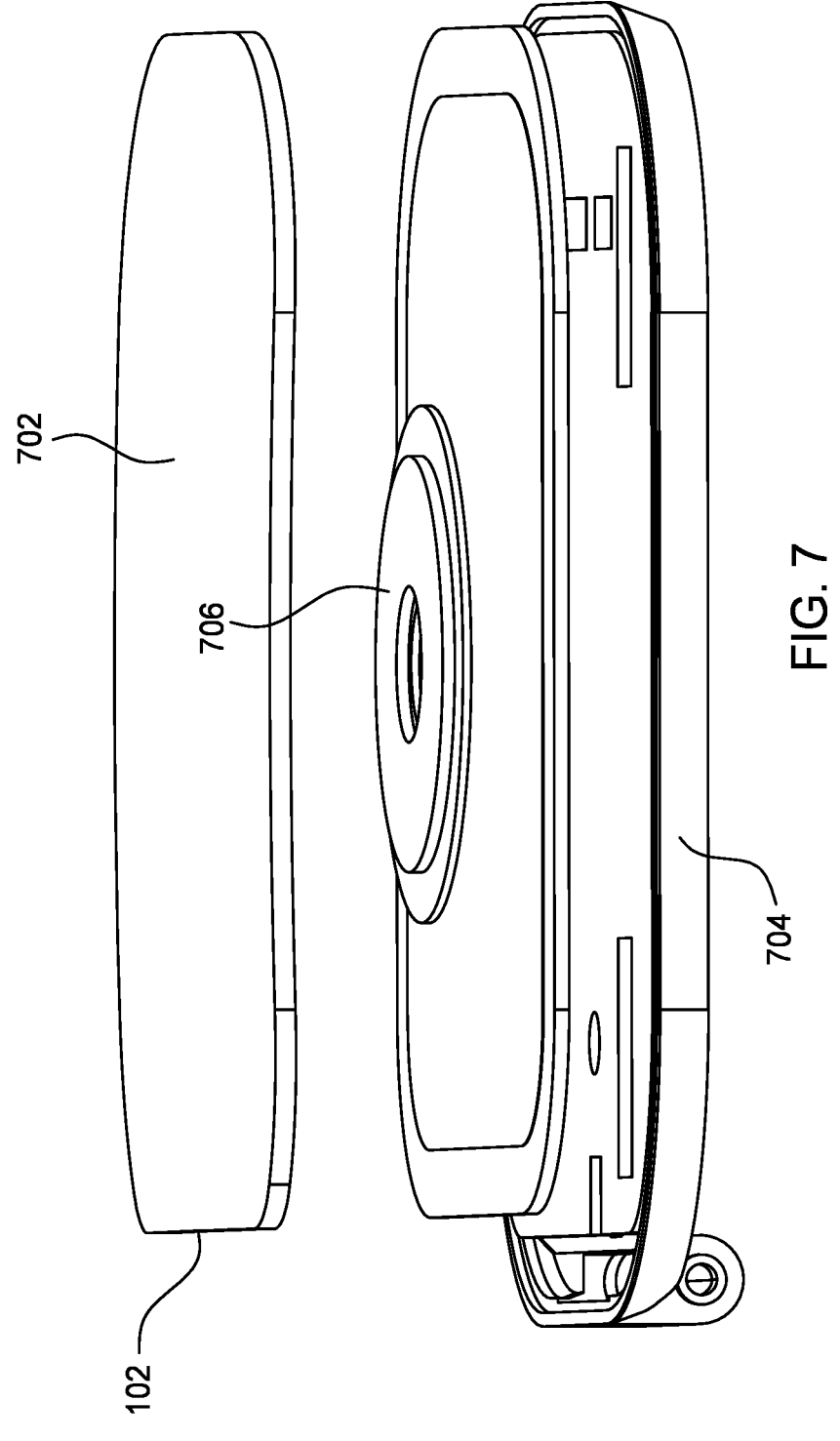
FIG. 7 illustrates a portion of the compact of FIG. 1.

FIG. 7 illustrates a portion of the compact 100 of FIG. 1. Specifically, FIG. 7 illustrates the upper portion 102 of the compact 100. As seen in FIG. 7, the upper portion 102 includes a cover 702, a cover 704, and a coil 706. The cover 702 and the cover 704 form a housing that protects the coil 706. The cover 702 and the cover 704 may couple to each other to form the housing. As seen in FIG. 7, the cover 702 may include a flat surface that allows another device to rest on the cover 702. When the device is resting on the cover 702, the device may be close enough to the coil 706 to wirelessly charge using an oscillating electric field produced by the coil 706.

The coil 706 is housed within the upper portion 102. The coil 706 may be electrically coupled to the circuit 604 and the battery 602 (shown in FIG. 6). For example, a wire may extend from the circuit 604 through a hinge in the compact 100 to the coil 706. The wire supplies electric energy from the battery 602 and the circuit 604 to the coil 706. When electric energy is supplied to the coil 706, the coil 706 produces an oscillating electric field that emanates towards the cover 702. A device resting on the cover 702 wirelessly charges using the oscillating electric field produced by the coil 706. As discussed previously, a button 304(shown in FIG. 3) may be pressed to activate or deactivate the wireless charging feature. When the button 304 is pressed, the wire may begin supplying electric energy to the coil 706 to produce the oscillating electric field. When the button 304 is pressed again, the wire may stop supplying electric energy to the coil 706, and the coil 706 may stop producing the oscillating electric field.

In summary, a cosmetic compact 100 provides several technical features. The cosmetic compact 100 includes a battery 602 and a circuit 604 that provide electric energy to power some of these features. For example, the cosmetic compact 100 may include a light 504 (e.g., light emitting diode) around a mirror 502 in the compact. The light 504 illuminates a user's face when the user is applying cosmetic products. Additionally, the light 504 may signal a charging status of the battery 602. As another example, the cosmetic compact 100 may include a coil 706 that produces an oscillating electric field, which allows the compact 100 to wirelessly charge another device near the compact 100. As yet another example, the compact 100 may serve as a power bank and use the battery 602 to charge another device that is connected to the compact 100 through a port 202 on the compact 100. In this manner, the compact provides additional technical features relative to conventional compacts.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

In view of the foregoing, the scope of the present disclosure is determined by the claims that follow.

I claim:

1. A compact comprising:
   a lower portion;
   an upper portion movably coupled to the lower portion by a hinge such that the upper portion rotates about the hinge to transition from a closed state to an open state;
   a first mirror disposed in the upper portion such that the first mirror is visible when the upper portion is in the open state;
   a battery disposed within the lower portion;
   a circuit electrically coupled to the battery; and
   a coil disposed within the upper portion and electrically coupled to the circuit such that the coil is configured to produce an oscillating magnetic field to charge another device when electric power is provided to the coil by the battery and through the circuit.

2. The compact of claim 1, further comprising a light positioned along a periphery of the first mirror and electrically coupled to the circuit, wherein the light is visible when the upper portion is in the closed state.

3. The compact of claim 2, wherein the light indicates a charging status of the battery.

4. The compact of claim 1, wherein the battery is rechargeable through a port on the circuit, and wherein the battery is dischargeable through the port.

5. The compact of claim 1, further comprising:
a button disposed in the lower portion and operable to stop the battery from providing electric power to the coil; and
a light disposed in the lower portion, wherein the light is arranged to activate when the battery is providing electric power to the coil.

6. The compact of claim 1, further comprising a second mirror disposed in the upper portion such that the second mirror is visible when the upper portion is in the open state.

7. The compact of claim 1, further comprising a wire electrically coupled to the coil and the circuit through the hinge.

8. The compact of claim 1, wherein an outer rim of the upper portion is beveled.

9. The compact of claim 1, wherein an outer surface of the upper portion is flat.

10. The compact of claim 1, further comprising a pocketed surface disposed in the upper portion such that the pocketed surface is visible when the upper portion is in the open state.

11. A system comprising:
a lower portion;
an upper portion movably coupled to the lower portion by a hinge such that the upper portion rotates about the hinge to transition from a closed state to an open state;
a first mirror disposed in the upper portion such that the first mirror is visible when the upper portion is in the open state;
a battery disposed within the lower portion; and
a coil disposed within the upper portion and electrically coupled to the battery such that the coil is configured to produce an oscillating magnetic field to charge another device when electric power is provided to the coil by the battery.

12. The system of claim 11, further comprising a light positioned on the first mirror and electrically coupled to the battery, wherein the light is visible when the upper portion is in the closed state.

13. The system of claim 12, wherein the light indicates a charging status of the battery.

14. The system of claim 11, further comprising:
a button disposed in the lower portion and operable to stop the battery from providing electric power to the coil; and
a light disposed in the lower portion, wherein the light is arranged to activate when the battery is providing electric power to the coil.

15. The system of claim 11, further comprising a second mirror disposed in the upper portion such that the second mirror is visible when the upper portion is in the open state.

16. The system of claim 11, further comprising a wire electrically coupled to the coil through the hinge.

17. The system of claim 11, wherein an outer rim of the upper portion is beveled.

18. The system of claim 11, wherein an outer surface of the upper portion is flat.

19. The system of claim 11, further comprising a pocketed surface disposed in the upper portion such that the pocketed surface is visible when the upper portion is in the open state.

20. A system comprising:
a lower portion;
an upper portion movably coupled to the lower portion;
a first mirror disposed in the upper portion;
a battery disposed within the lower portion; and
a coil disposed within the upper portion and electrically coupled to the battery such that the coil is configured to produce produces an oscillating magnetic field to charge another device when electric power is provided to the coil by the battery.

* * * * *